(No Model.)  
11 Sheets—Sheet 1.

J. A. WHITE.
TYPE WRITING MACHINE.

No. 574,970. Patented Jan. 12, 1897.

Witnesses  
[signature]  
E. P. Jewett

Inventor  
Joseph A. White  
Per Edwin W. Brown  
Atty.

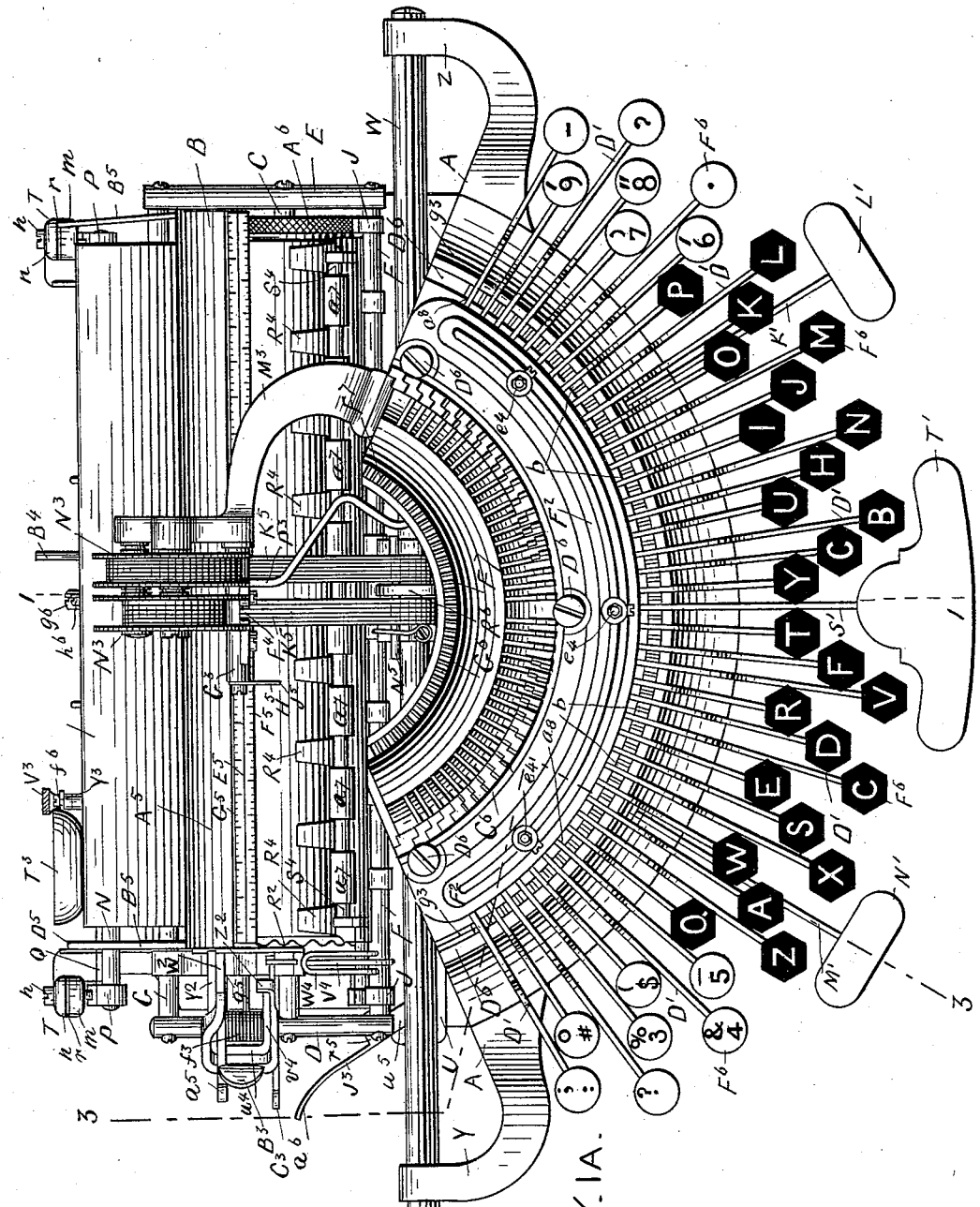

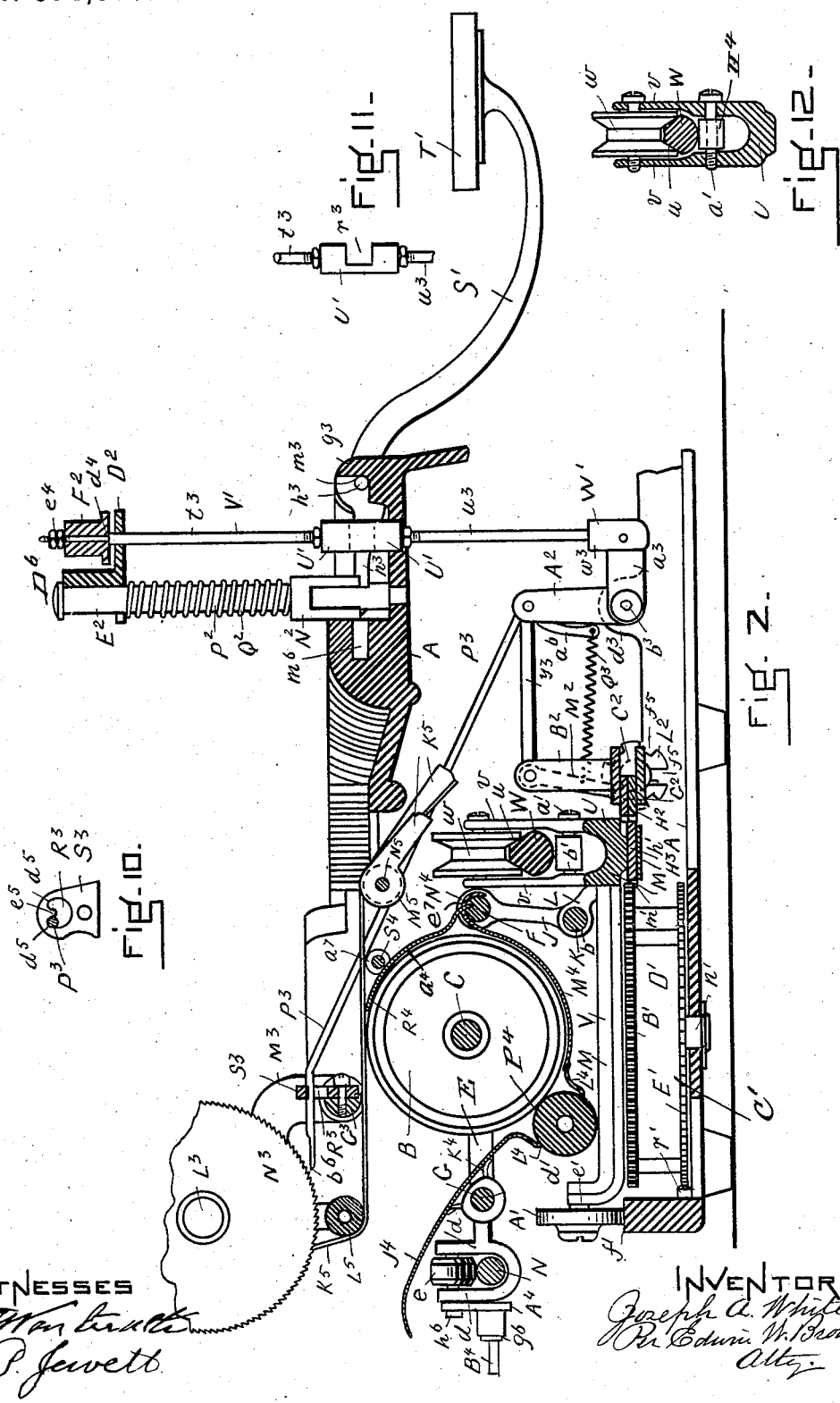

(No Model.) 11 Sheets—Sheet 4.

J. A. WHITE.
TYPE WRITING MACHINE.

No. 574,970. Patented Jan. 12, 1897.

WITNESSES
INVENTOR
Joseph A. White
Per Edwin W. Brown
Atty.

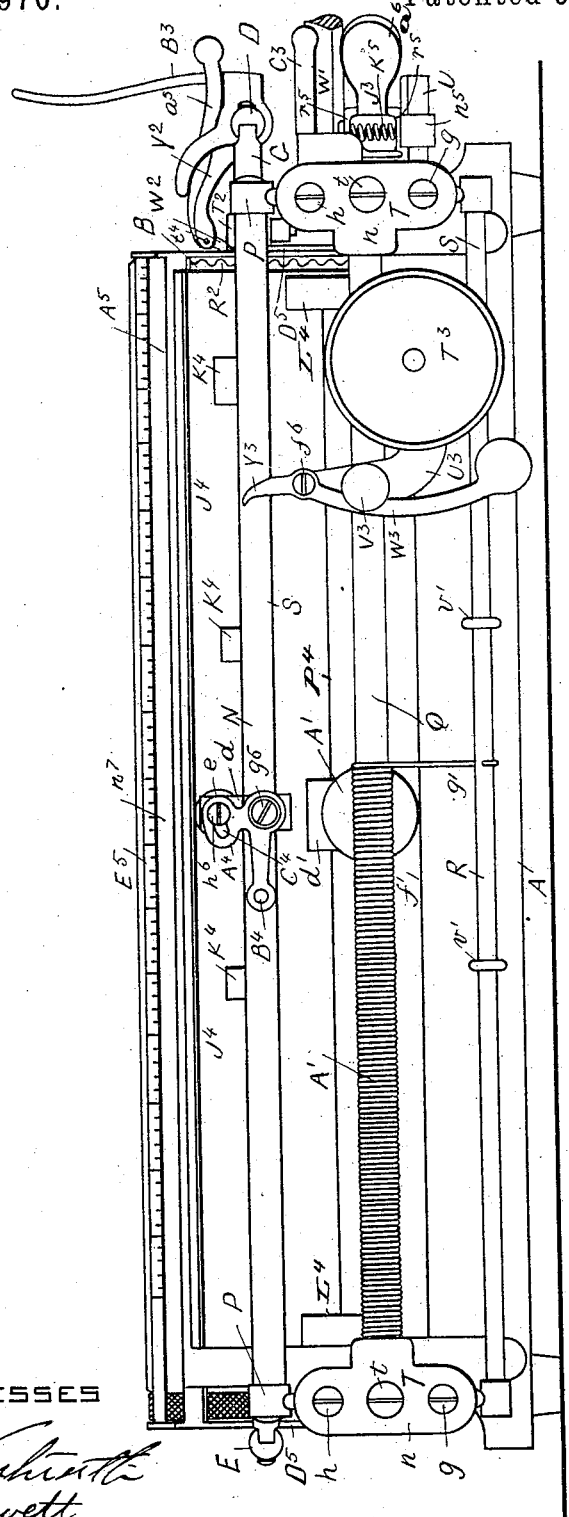

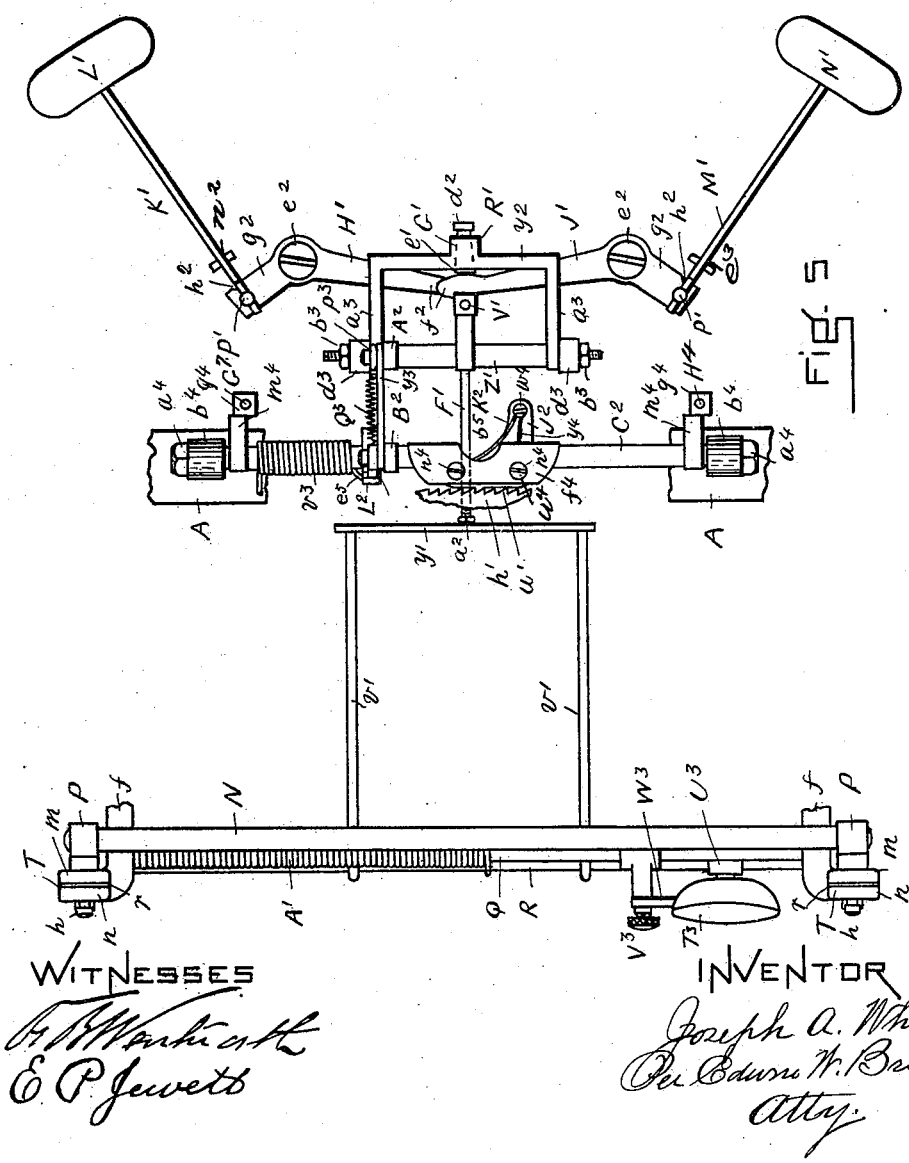

(No Model.) 11 Sheets—Sheet 7.
J. A. WHITE.
TYPE WRITING MACHINE.
No. 574,970. Patented Jan. 12, 1897.
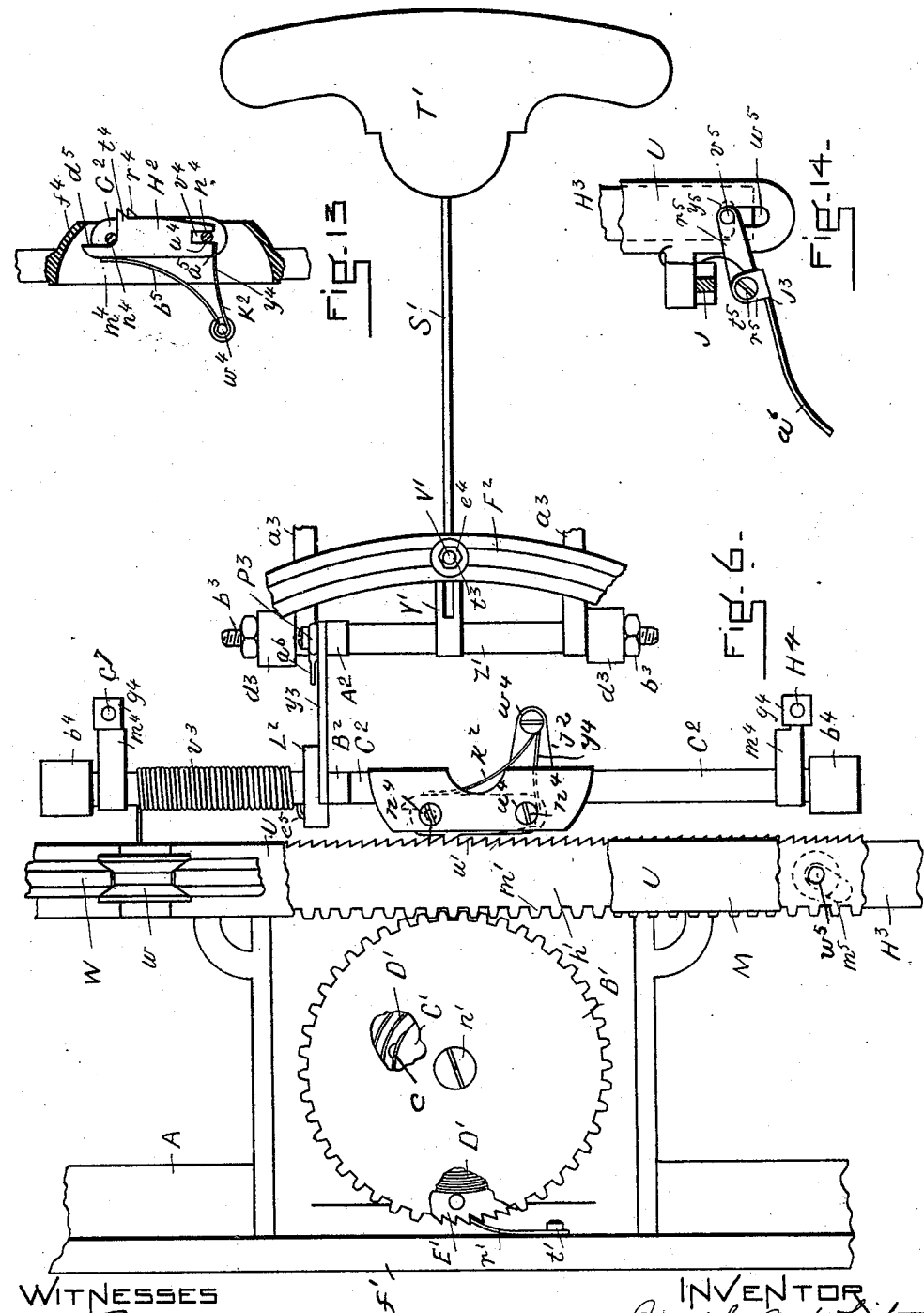
WITNESSES
INVENTOR
Joseph A. White
per Edwin W. Brown
Atty (No Model.) 11 Sheets—Sheet 8.
J. A. WHITE.
TYPE WRITING MACHINE.
No. 574,970. Patented Jan. 12, 1897.
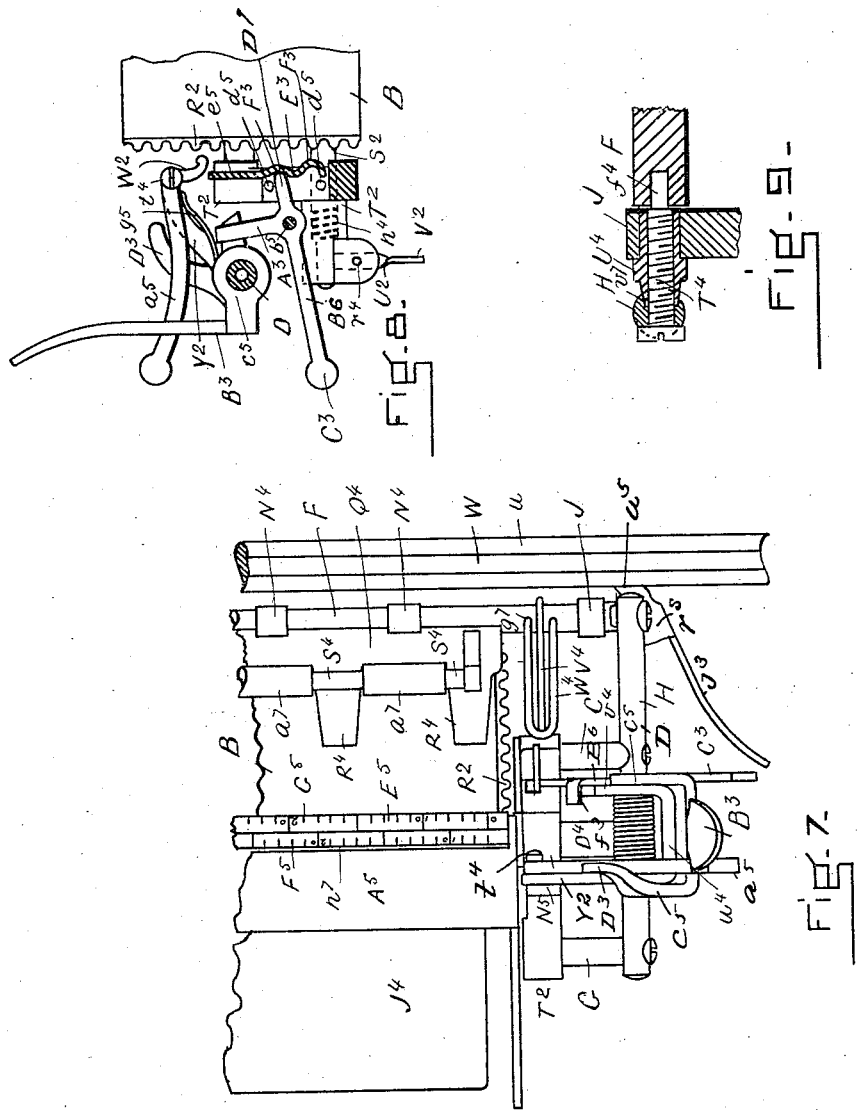
Witnesses
Inventor
Joseph A. White
Per Edwin W. Brown
Atty.

(No Model.)
11 Sheets—Sheet 9.
J. A. WHITE.
TYPE WRITING MACHINE.
No. 574,970.
Patented Jan. 12, 1897.
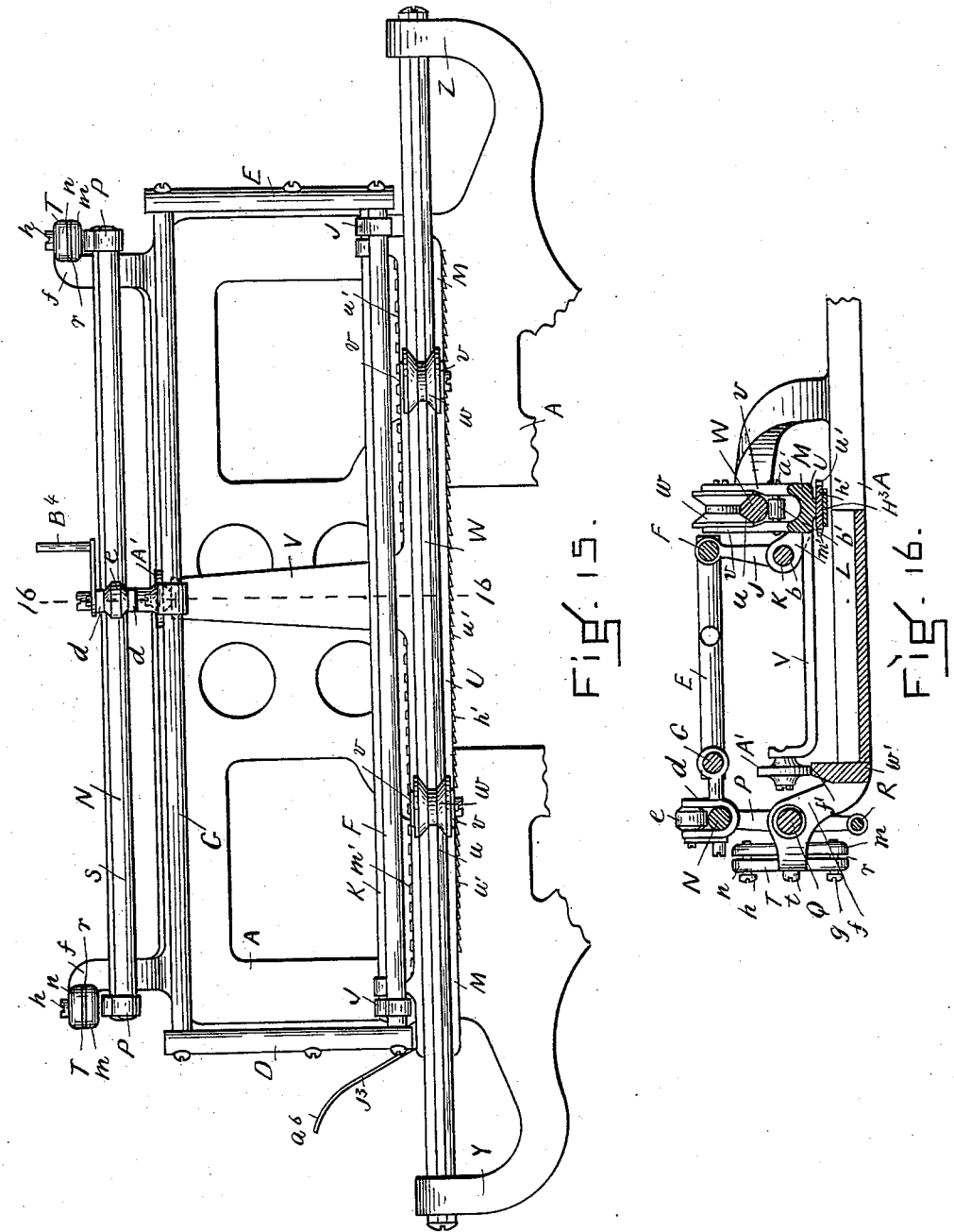

(No Model.) 11 Sheets—Sheet 10.
J. A. WHITE.
TYPE WRITING MACHINE.
No. 574,970. Patented Jan. 12, 1897.
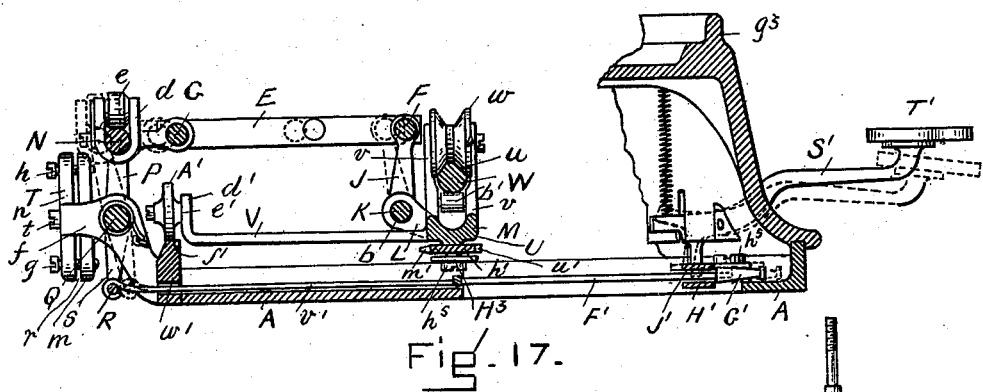
Fig. 17.
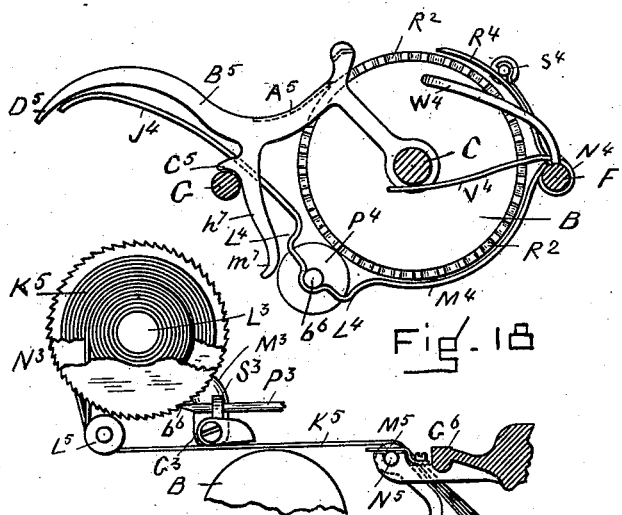
Fig. 18.
Fig. 19.
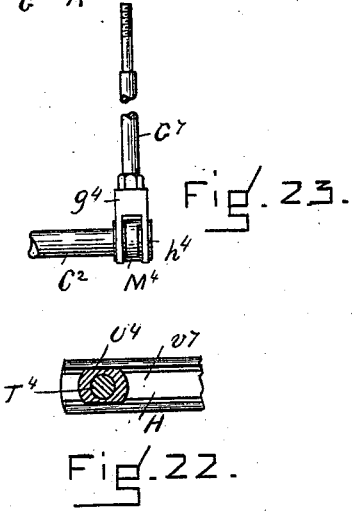
Fig. 23.
Fig. 22.
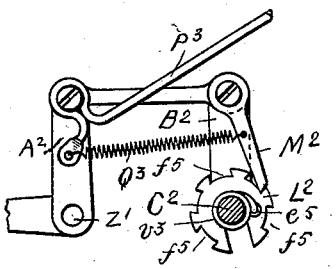
Fig. 21.
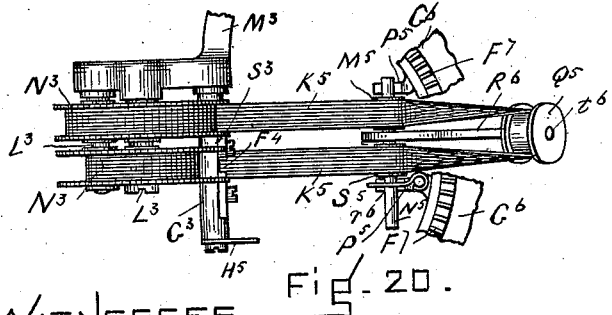
Fig. 20.
WITNESSES
Luella M. Marr
Lona C. Ano.
INVENTOR
Joseph A. White
Per Edwin W. Brown
Attorney

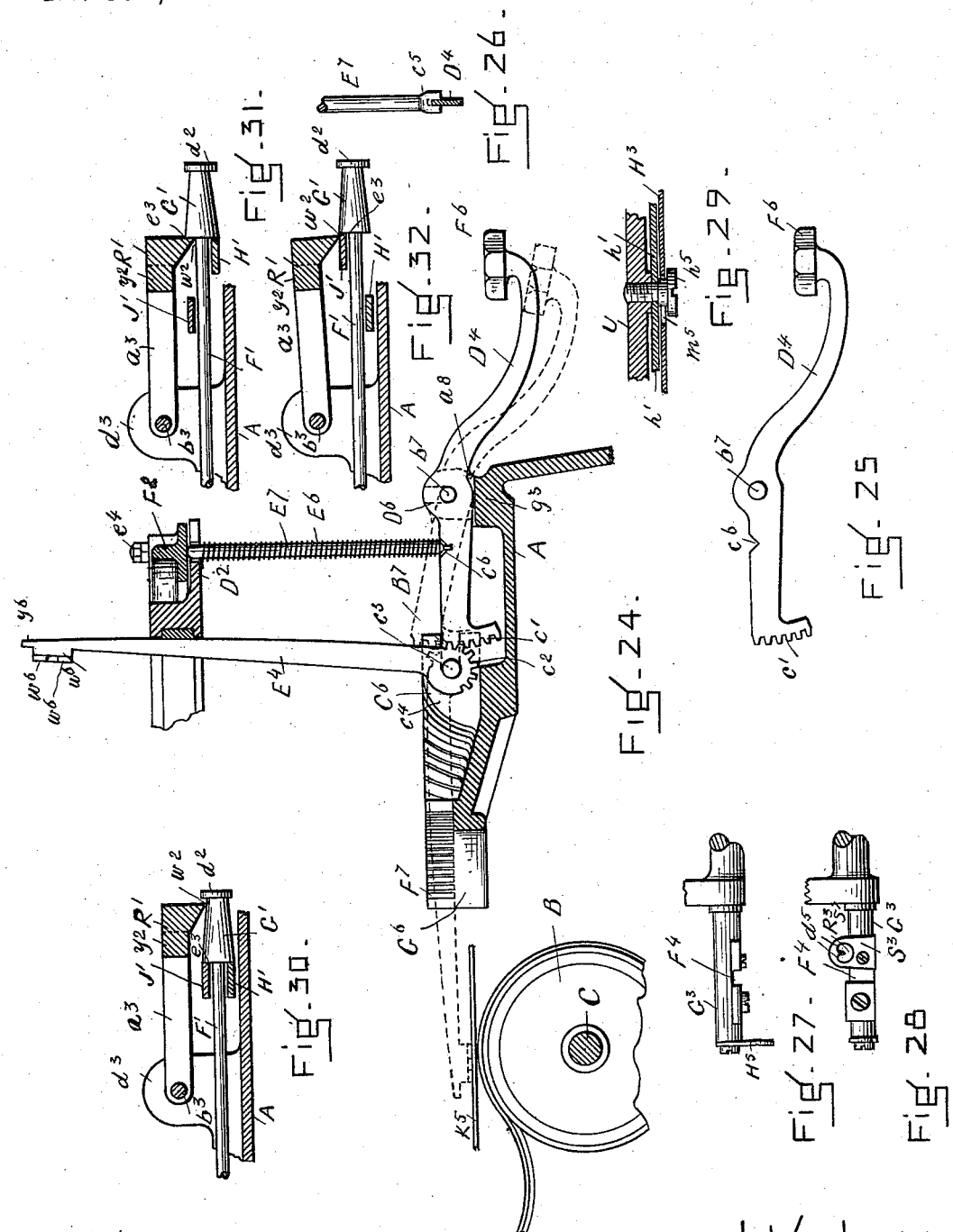

UNITED STATES PATENT OFFICE.

JOSEPH A. WHITE, OF BOSTON, MASSACHUSETTS.

TYPE-WRITING MACHINE.

SPECIFICATION forming part of Letters Patent No. 574,970, dated January 12, 1897.

Application filed April 17, 1893. Serial No. 470,700. (No model.)

*To all whom it may concern:*

Be it known that I, JOSEPH A. WHITE, of Boston, in the county of Suffolk and State of Massachusetts, have invented certain new and useful Improvements in Type-Writing Machines, of which the following is a full, clear, and exact description.

This invention relates to improvements in type-writing machines, and to the type-writing machine called the "Franklin;" and the invention consists in a type-writing machine of certain construction and arrangement of parts, all substantially as hereinafter fully described, reference being had to the accompanying sheets of drawings, in which is illustrated a type-writing machine constructed and arranged for operation in accordance with this invention.

Figure 1:
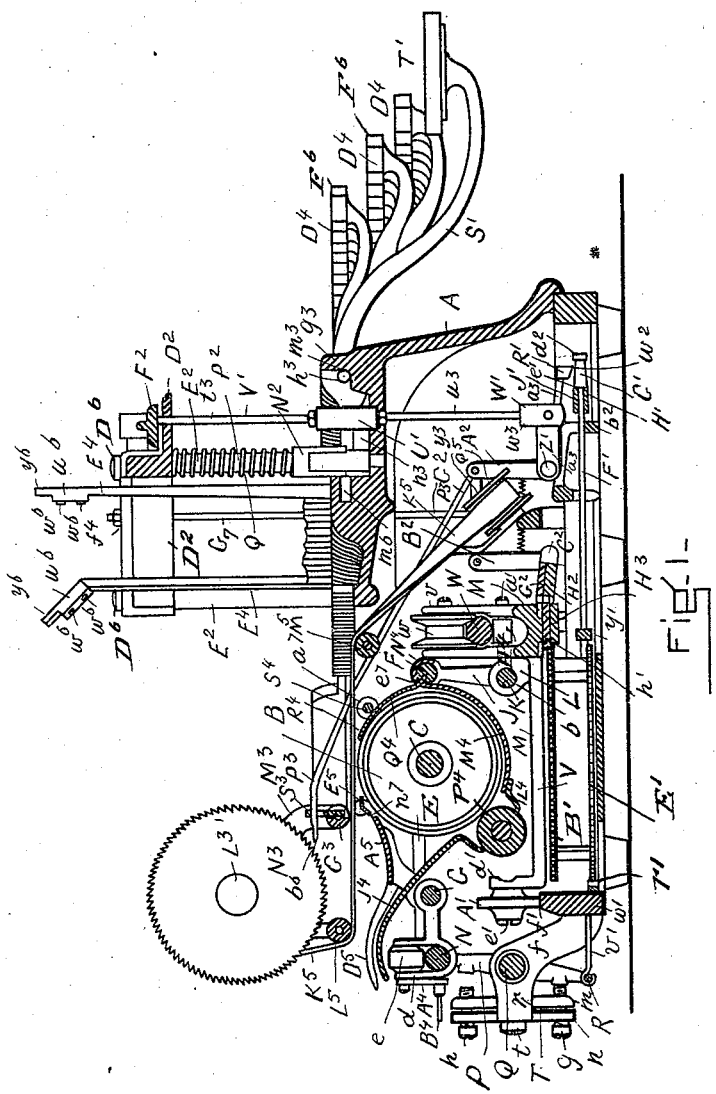
Figure 3:
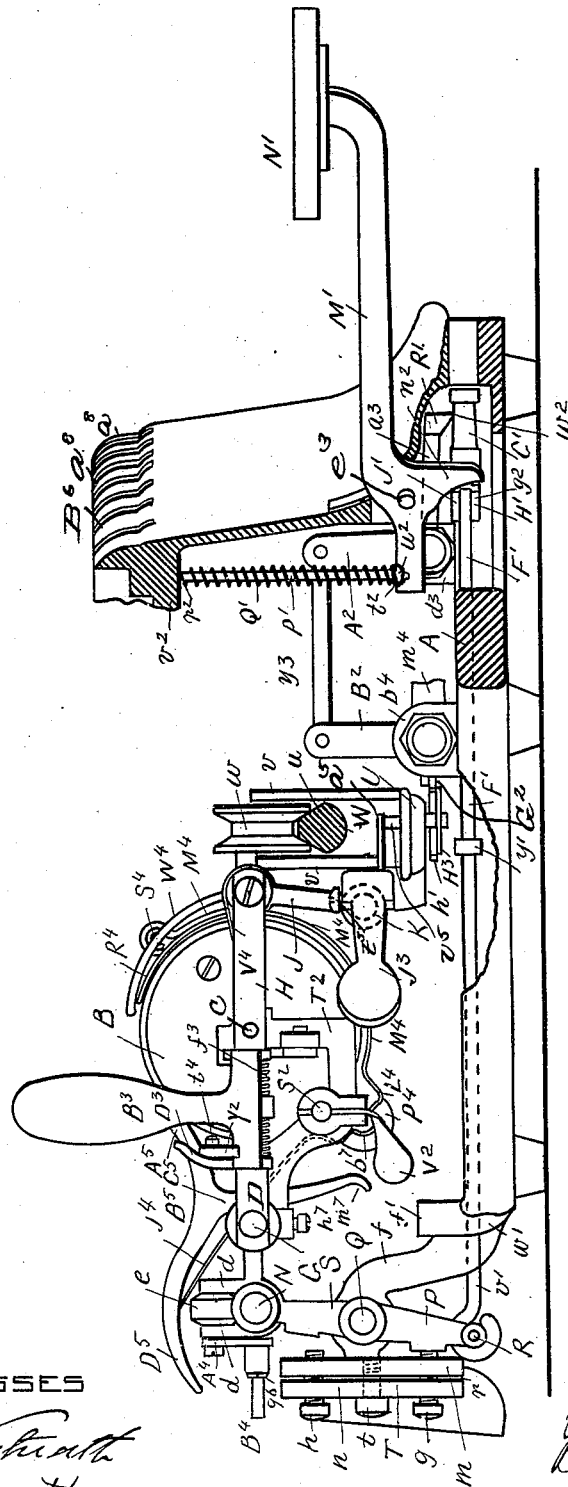

Figure 1ᴬ is a plan view of the machine, Figs. 1 and 2 being a vertical central transverse section on line 1 1, Fig. 1ᴬ. Fig. 3 is a vertical transverse section on line 3 3, Fig. 1ᴬ. Fig. 4 is a rear elevation. Figs. 5 and 6 are respectively plan views of the operating parts connected, respectively, with the shift-levers and space-lever. Fig. 7 is a detail plan view of one end of the paper roll or platen and parts connected therewith. Fig. 8 is a detail front view and partial vertical section of some of the parts shown in Fig. 7. Fig. 9 is a detail section of a corner of the end of one of the rods of the paper roll or platen frame and its connections. Fig. 10 is a detail elevation of one of the parts. Fig. 11 is a detail side view of one of the parts in Fig. 2; Fig. 12, a detail section; Fig. 13, a detail view of parts shown in Fig. 6, but of the under side. Fig. 14 is a detail plan view. Fig. 15 is a plan view of a portion of the frame of the machine and the paper-platen frame in position thereon. Fig. 16 is a cross-section on line 16 16, Fig. 15. Fig. 17 is a section similar to Fig. 16 with the continuation of the line through the front of the machine. Fig. 18 is an end view of the platen-roll and feed-rolls, with other parts in side view in connection with the platen-rolls. Figs. 19 and 20 are respectively detail side and plan views of the ink-ribbon and its attaching parts for operation thereof. Fig. 21 is a detail side view of parts to be hereinafter referred to. Fig. 22 is a detail section and side view. Fig. 23 is a detail side view. Fig. 24 is a detail side elevation of the key, type-bar, and mode of operation. Fig. 25 is a side view of a key detached. Fig. 26 is a detail view. Figs. 27 and 28 are detail plan and front views of the bar having the alinement-slot and parts connected therewith. Fig. 29 is a detail section. Figs. 30, 31, and 32 are respectively sections and elevations of some of the parts connected with the shifting mechanism.

In the drawings, A represents the framework which supports and carries the various parts of the machine.

B is the paper roll or platen, having a central longitudinal shaft C, adapted to turn by its outer ends as journals in bearings in two cross-rods D E, secured at their ends to two longitudinal rods F G and making the platen or paper roll frame H, the shaft having a milled head $A^6$ secured to it to turn the platen by hand when desired. This frame H by its front rod F at each end is connected to a link J, in which the rod can turn, the other or lower ends of the links being rigidly connected to the ends, respectively, of a horizontal rod K, adapted to turn in bearings $b$ in lugs L, one at each end of the carriage-frame M.

The carriage-frame M consists, substantially, of a long plate-bar U, having a central horizontal right-angle bar V extending back therefrom, the bar U being located below a horizontal transverse guide-rod W, extending from an arm Y of the frame to another arm Z at the opposite side and rigidly secured thereto, its upper side being substantially of a wedge shape in cross-section, as at $u$. The bar U near each end has upright arms $v$, one from each side of the bar, which straddle the guide-rod W, between and to which arms above the rod W is pivoted a grooved roll $w$, which rolls on their peripheries are shaped to fit the upper side $u$ of the rod W and are adapted to run thereon, supporting the carriage-frame at this side.

$a'$ is a screw which passes through one arm and screws into the opposite arm of the arms $v$, and on this screw, between the two arms, is a loose sleeve or antifriction-roll $b'$, which is located under the guide-rod to prevent any upward movement of the carriage-frame, but not to interfere with its free movement back and forth on the guide-rod W.

The central arm V at its end is bent upward, as at $d'$, and has pivoted thereto at $e'$ a wheel or roll $A'$, which is arranged to roll or run upon a horizontal flat edge $f'$ of the frame, parallel with the guide-rod W, so that the carriage-frame can be moved back and forth on its resting-rolls and wheels $w$ on the guide-rod W and the edge $f'$.

Secured centrally to the rear rod G of the platen-frame H is a ∪-shaped arm $d$, its arms extending upward and straddling a horizontal rod N and having pivoted to its two arms a roller or wheel $e$, which rests and is adapted to run on the rod N. This rod N is secured by its ends in the upper ends of two upright bars P, which are secured by their centers on the ends of a parallel rod Q, adapted to turn in bearings in two rearwardly-extending lugs $f$ of the frame, one at each end, the lower ends of these two upright bars P being rigidly connected together by a rod R, smaller in diameter, these rods and bars constituting a frame S, which is the shift-frame for the paper roll or platen frame, the shift-frame swinging on its rod Q, its backward movement being limited by the abutment of the upper portions of its bars or arms P against screws $h$, screwing through the upper ends of vertical arms T of the lugs $f$, and its forward movement by the lower portion of the upright bars P abutting by their lower ends against screws $g$, screwing through the lower ends of the vertical arms T. These upright arms T are in two parts $m\,n$, having a space $r$ between them, but each forming a continuation of their respective lugs $f$, the screws $g\,h$ screwing through the two parts and a central screw $t$ passing loosely through the rear part $n$ and screwing into the other part, $m$, to set by its pressure the screws $g\,h$. Turning in or out the screws $g\,h$ adjusts and regulates the movements of the shift-frame S.

The normal position of the shift-frame S is with its upper rod N forward, as shown in the views, and encircling its central rod Q is a spiral spring $A^5$, one end $g'$ extending down and bent round the rod R to secure such end, and its other end engaging with a hook of the lug $f$, which acts to hold and return the frame to its normal position if moved backward.

$h'$ is a flat horizontal bar which is secured by screws to the under side of the longitudinal bar U of the carriage-frame M, to have it a short distance below it, its rear edge being toothed, as at $m'$, forming a rack-bar, with which engages a horizontal gear $B'$, to which gear is secured a barrel $C'$ on its under side, arranged to turn upon a screw $n'$ as a pivot, screwing into the bottom of the frame, and on this barrel is wound a spiral spring $D'$, one end of which is secured to the barrel $C'$, as at $e$, and the other end to a ratchet-wheel $E'$ below the barrel, adapted to turn upon the screw-pivot $n'$, but prevented from backward movement by a spring-pawl $r'$, secured at $t'$ to a rim of the frame, its free end engaging with the teeth of the ratchet-wheel, as shown in Fig. 13 more particularly. The spring $D'$, through its gear connection $B'$ with the carriage-frame rack-bar $h'$, acts to move the carriage-frame to the left whenever the parts controlling it are released to allow it, and as the carriage-frame is moved back or to the right for another movement it rewinds the spring for its action again, its tension being regulated by turning the ratchet-wheel $E'$, which is held by its spring-pawl.

$D^4\,D^4$ are the printing or finger keys, arranged in curved lines at the front of the machine and extending backward, each key being disposed in a radial groove $a^8$ in a curved raised portion $g^3$ of the frame and having pivots $b^7$, which lie in a groove or seat $D^6$ of the bar $g^3$, (see Fig. 1$^\mathrm{A}$,) extending the length of the bar, the inner end of the key extending to and into a vertical open radial groove $B^7$ in an inner curved bar $C^6$ of the frame concentric to the curved bar $g^3$, the key end forming a segment of a gear $c'$, which meshes with another segment of a gear $c^2$ of the lower end of a type-bar $E^4$, having pivots $c^3$, which lie in an open horizontal groove $c^4$ in the curved bar $C^6$, forming a bearing for said pivots and yet leaving the same free to be removed as desired.

$E^7$ is a vertical wire, its lower end being widened to make a shoulder $c^5$ and forked to straddle the edge of the key and resting in a notch $c^6$ in the upper edge of the key, back of its pivot, which serves to retain the wire or rod in its bearing or seat, the upper end of the rod extending freely up through a horizontally backwardly curved plate $D^2$ concentric with the bars $g^3$ and $C^6$ and rigidly secured by screws to the upper ends of the three upright posts $E^2$ of the frame A, one in the middle and one at each end. On this wire $E^7$ is a spiral spring $E^6$, which bears on the shoulder $c^5$ and against the under side of the permanent curved arm-plate $D^2$, which acts by its tension to hold the wire to its seat, and exerting its pressure upon the rear arm of the key holds it in its natural and normal position.

The upper end of the pivoted type-bar $E^4$ has on its inner side, near its end, a short block $u^6$, having on its face two types $w^6$, one at each end, the arm projecting a short distance beyond the block, as at $y^6$. Each type-block has preferably two different types or letters, for instance on one end a small letter and on its other end its capital or another letter or character. Each key has a separate type-bar, and in their upright position they rest and bear against the inner side of the curved arm $D^2$, such side being covered with leather or similar material to make a noiseless and soft seat.

As the type-bars are arranged in a curved line and extend radially to a common center, which is the slot, and as this slot is transverse or at right angles to the paper-roll or its longitudinal movements, the type-blocks $w^5$ are arranged rigidly to their respective type-bars, on angular portions thereof, which angles gradually vary from the two central bars, which are substantially straight, each way to the outer ones of the curve, so that when each of the type-bars are swung down the type on its type-block will be presented to the plate or roll for the letter or figure to be printed on the paper on the platen in a straight line, the angular part of the type-bar on which the block is secured being made by bending the type-bar laterally correspondingly, as shown in the drawing more particularly.

On the outer or operating end of each finger-key is secured a button $F^6$, on the upper surface of which is printed or marked in any suitable manner the letter or character which is to be printed by the type connected to such key.

Pressing down a key by its gear connection with a type-bar $E^4$, the bar is swung down on its pivot until its type strikes upon the ink-ribbon $K^5$ just above the paper roll or platen N, its middle portion entering a slot $F^7$ in the part $G^6$ of the frame, and the projecting ends $y^6$ of the type-bar entering the slot $F^4$.

The universal bar $F^2$ has two downwardly-extending wires $G^2$ and $H^2$, one at each end, which extend freely through the plate, and each is secured to the universal bar by two screw-nuts $e^4$, screwing on the upper ends of the rods, holding the universal bar firmly against flanges or shoulders on the rods. To the lower end of each wire is secured a block $g^4$, between the lower arms of which is pivoted at $h^4$ a forwardly-extending horizontal arm $m^4$ or a rock-shaft $C^2$, turning on center pivots of screws $a^4$ in lugs $b^4$ of the same. At the central portion of this rock-shaft is a backward extension $f^4$ in a horizontal opening $m^4$, in which is a horizontal plate $G^2$, secured by screws $n^4$, having a ratchet-tooth $r^4$ extending backward, and which is back of the center axial line of its shaft, and in the same opening below the ratchet-tooth plate $G^2$ is another plate, having a ratchet-tooth $t^4$, the plate being pivoted on one $u^4$ of the securing-screws $n^4$ by a longitudinal slot $v^4$.

On a forward-projecting horizontal arm $J^2$ of the rock-shaft $C^2$, forward of the securing-screw pivot $n^4$, is secured by a screw $w^4$ a flat spring $K^2$, set up edgewise, nearly encircling the screw, and one of its arms, $y^4$, extending backward to bear against one end $a^5$ of the tooth-plate pawl $H^2$, and its other arm, $b^5$, being bent to bear upon and against the forward edge of the opposite end of the tooth-pawl (see Fig. 13) and hold it to its bearing by its rear edge $d^5$ against the screw $n^4$, securing the plate in place, which serves as a rest to limit its backward movement and as a bearing or guide, with its bearing-slot $v^4$, to its longitudinal movement, which is limited to the length of the slot.

A spiral spring $v^3$ surrounds a portion of the rock-shaft $C^2$ and by one end $e^5$ is secured to a plate $L^2$, having transverse grooves $f^5$ in its edge, adapted to turn on the rock-shaft, and held by a spring-pawl $M^2$, engaging by a spring-pawl therewith and pivoted on the screw of the arm $B^2$, and the other end of the spring $v^3$ extending and bearing on the bottom of the frame, the turning of the grooved plate of the rock-shaft in a suitable direction increasing or decreasing the tension of the spring $v^3$, which spring serves to return the rock-shaft to its normal position after it has been moved by the type-key.

On the front edge of the flat bar $h'$, secured to the bar U of the carriage-frame, is a series of ratchet-teeth $u'$, (see Fig. 6,) which extend the length of the bar, and the teeth of the plates $G^2$ $H^2$ are arranged to engage therewith, and the slot $v^4$ in the plate $H^2$ is of a length equal to the distance between two teeth of the ratchet-bar $h'$.

Connected to the lower rod R of the shift-frame are two wires $v'$, which extend forward freely through rim $w'$ of the frame and are connected together by a cross-bar $y'$. A rod $F'$ screws into the central portion of this cross-bar $y'$, being secured by a set-nut $a^2$ and extending forward through a rim or edge $b^2$ of the frame to the front, having on its outer end a block or segment of a cone $G'$, its larger end inward, which cone is secured by a set-nut $d^2$, screwing onto the rod $F'$.

$H'$ $J'$ are two horizontal levers pivoted, respectively, at $e^2$ on the bottom of the frame, the end $f^2$ of one lever, $H'$, being located under and the other, $J'$, above the wire or rod $F'$, both being in their normal position just back of and arranged to bear by their edges against the larger end of this cone.

The arm $g^2$ of the lever $H'$ has a notch $h^2$ in the front edge, against which bears a downwardly-projecting arm $m'$ of a lever $K'$, pivoted at $n^2$ to the frame and freely passing through a slot in the frame to the front below the keys, and having a large thumb-piece $L'$ on its outer end for operation thereof. The arm $g^2$ of the other lever $J'$ has also a notch $h^2$ in its edge, with which engages a downwardly-projecting arm $n^2$ of a lever $M'$, pivoted at $e^3$ to the frame and freely passing through a slot in the frame, and extending out under the keys in front, having a thumb-piece $N'$ for operation thereof, both of these levers being shifting levers.

$P'$ is a vertical wire, one to each shift-lever, which extends up into a socket in the upper part $r^2$ of the frame and is enlarged and flattened at its lower end to form a shoulder $t'$ and forked end $u^2$, which straddles the lever and rests in a notch in the upper edge of the lever, on which wire is a spiral spring $Q'$, which bears up against the under side of the frame portion $v^2$ and on the shoulder of the wire, which serves to hold the lever in and return it to its normal position.

Above the cone-block $G'$ is a small weight $R'$, having its under edge cut back to present a sharp edge $w^2$, which rests by such edge on the cone-block, this weight being on front arm $y^2$ of a frame which at two ends extends back in two arms $a^3$, which are pivoted at their ends to screws $b^3$ in lugs $d^3$ of the frame, by which the weight can swing up and down.

Pressing down the lever or shift-key, through its connection with the shift-key $M'$ and the rod $F'$ the shift-frame is swung upon its central-rod pivot and moved back, carrying back with it the paper roll or platen, which so remains as long as the key is held down, but immediately the key is allowed to rise the spring $A'$ serves to return the shift-frame, paper-roll frame, and lever $M'$ to their normal positions; but if desired to hold the shift-frame and paper-roll frame in their back position without holding onto this shift-key press down the other shift-key $K'$, which operates the shift-frame, &c., as before, but when it has moved the rod forward the weighted pawl $R'$ will drop down for its edge $w^2$ to be back of the shoulder or end $e^3$ of the cone $G'$, against which the cone $G'$ abuts and is held from movement and prevents the return of the wire, and consequently the shift-frame and the paper-roll frame are held in such position. To release the shift-frame, press down the other shift-key $M'$, which moves the lever $J'$, its end $f^2$ passing under the weighted pawl $R'$ and raising it above and free of the cone-block. The wire $F'$ is free for the spring $A'$ to the shift-frame to return all to their normal positions.

$S'$ is a lever or the space-key, and it projects from the central line of the machine, having a broad thumb-piece $T'$ between and in front of the keys for ready operation, and it extends through an opening in the curved vertical portions $g^3$ of the frame, having pivots $h^3$ resting in an angular bearing $m^3$ in said frame portion, its inner end $n^3$ extending through a side opening $r^3$ in a block $U'$ of a vertical rod $V'$, made in two parts or wires $t^3 u^3$, screwing, respectively, into the upper and lower ends of the block, the lower end of the rod screwing into a block $W'$ and secured by a set-screw, which block has pivoted to and between its two arms $w^3$ a horizontal arm of a bar $Z'$, adapted to rock or partially turn on the pivot $b^3$ of the frame of the weight-pawl $R'$, and which bar $Z'$ has a vertical arm $A^2$ at one end, which is connected by a pitman-rod $y^3$ to the upright arm $B^2$ of the rock-shaft $C^2$. The upper end of the rod $V'$ passes up freely through the curved bar $D^2$ and through a curved or universal bar $F^2$, which bar rests on a shoulder $d^4$ on the rod and is secured thereto by a set-screw $e^4$. Pressing down this space-key $S'$ by the three wire connections to the universal rod or bar $F^2$ with the rock-shaft $C^2$, it is caused to rock or swing on its centers correspondingly. With the space-key in its normal position the rock-shaft $C^2$ is in such position that the tooth $t^4$ of its pivoted-plate pawl $H^2$ will engage with a ratchet-tooth on the front edge of the longitudinal bar $h'$ of the carriage-frame, and as the carriage-frame is controlled by the spring $D'$, which pulls it to the left, it presses the spring-tooth pawl $H^2$ longitudinally back against the spring-arm $y^4$ the length of its slot, which there holds the carriage-frame from further movement, and in such position the tooth of the spring-tooth pawl is substantially in line or coincident with or just under the tooth $r^4$ of the permanent plate $G^2$, being, however, a slight distance ahead of it or to the right. As the space-key $S'$ is pressed down it causes the rock-shaft $C^2$, through its connections therewith, as described, to turn, so that the permanent-plate tooth $r^4$ is swung down to and engages with the ratchet-tooth bar of the carriage-frame and the spring-pawl tooth $t^4$ disengaged therefrom, and so long as the space-key is held down the carriage will be held in its position by this engagement. Immediately the spring-tooth pawl $H^2$ is disengaged from the carriage-frame ratchet-tooth bar it is pushed to the right the length of its bearing-slot $v^4$ by its spring $y^4$, so that its tooth will not be coincident with the permanent-plate tooth, but will be one tooth ahead or to the right and being free from engagement with the carriage-frame ratchet-bar. As the space-key is allowed to rise the rock-shaft spring acts to swing it back and the permanent-plate tooth upward and clear of the carriage-frame ratchet-bar, which leaves the carriage-frame free to move to the left by the tension of its spring; but before the permanent-plate tooth is disengaged from the ratchet-bar the spring-pawl is swung into position for its tooth to engage with the ratchet-bar, but one tooth farther ahead or to the right than when it was engaged therewith before the space-key was operated, and as the carriage-frame moves to the left from the action of its spring it carries with it the spring-pawl the length of its slot, which then stops the carriage-frame at such place. The pawl-tooth and permanent-plate tooth on the rock-shaft, projecting horizontally beyond the central axial line of the shaft, in the swinging of the same practically moves vertically, and they are so near together vertically that in the movement of the same up and down the tooth of one or the other will engage with the ratchet-tooth bar just before the other is disengaged therefrom, insuring control of the carriage-frame at all times. On the inner end of the space-key rests a sleeve $N^2$, which fits freely on the central post $P^2$ of the frame supporting the curved bar $D^2$, and on the post is a spiral spring $Q^2$, which bears against the under side of the curved bar and against the top of the sleeve and acts to hold the space-lever up in its normal position and return it thereto when moved down. Below the ratchet-bar $h'$ is a flat strip $H^3$, extending its length and secured thereto by the screws $h^5$, which secures the ratchet-tooth bar to the frame-bar, which pass through angular slots $m^5$ in the strip, and so the strip can freely move thereon as desired. This strip $H^3$ is in the same horizontal plane as the lower half or thickness of the spring-tooth pawl $H^2$ of the rock-shaft, and in its normal position its front edge is just back of the tooth of this pawl.

Pivoted to a lug $n^5$ on the end of the bar U of the carriage-frame is a horizontal lever $J^3$, having two arms $r^5$ bent at right angles, through which the pivot $t^5$ extends, and by which it is secured to the lug, and having an arm $u^5$, from which depends a pin $v^5$, which passes freely through a longitudinal slot $w^5$ in the bar U, and disposed in a cross-slot $y^5$ in the end of the strip $H^3$ below, see Fig. 14. Between the two arms $r^5$ of this lever $J^3$, surrounding its pivot $t^5$, is a spiral spring $K^3$, which bears by one end against the lug L and by its other against the lever-arm, by which the lever is held in the position shown in Fig. 14, and thus the strip back from and free of the spring-tooth pawl.

When desirous of letting the carriage-frame move any length by one movement beyond the limit of the spring-tooth pawl, by pressing the hand $a^6$ of the lever $J^3$ to the right the strip $H^3$ will be moved longitudinally to the left, and in such movement, being guided by its angular slots $m^5$, it will be moved forward sufficiently to press against and move the spring-pawl forward and free from the engagement of its tooth with the teeth of the carriage ratchet-bar, when the carriage-frame can be moved back and forth as desired, and releasing the lever the strip will be moved back by its lever-spring out of the way of the spring-tooth pawl, leaving it free to engage with the carriage-frame ratchet-bar again and hold it in place.

On the left-hand end of the paper roll or platen B are gear-teeth $R^2$, concentric with its shaft, with which engages the end of a pin $S^2$, adapted to slide back and forth horizontally in a bearing in a support $T^2$, secured to the rear rod of the paper-platen frame, and the platen-shaft having a spring $n^4$ in said bearing, which is arranged to hold the pin to its engagement with the paper-platen gear to keep the platen from turning accidentally, but not so but it can be turned by hand or other parts of the machine.

Pivoted at $r^4$ to this support is a lever $U^2$, one end of which engages with the pin $S^2$, so that pressing the handle $V^2$ of the lever to the right the pin will be moved backward against its spring and disconnected from the platen-gear, so that the platen will be free to be turned as described. The gear-teeth are preferably made a little rounding, as shown, and the engaging end of the pin correspondingly so to fit the space between the same to enable the platen to be turned easily by hand, or operating parts when desired, but not so much so but that the platen will be held from movement otherwise.

$W^2$ is a pawl arranged by its end to engage with the platen-gear above the pin and pivoted at $t^4$ to the end of an arm $Y^2$, arranged to rock on the cross-rod D of platen-frame, its portion $u^4$ extending along the rod a short distance and then bent forward and encircling the rod, making another bearing for the arm. An arm $a^5$ of the pawl extends beyond the cross-rod D as a weight to keep the pawl up in position to engage with the platen-gear when desired and as a handle for the same.

Adapted to rock on the cross-rod by two arms $c^5$, which are outside of the arms of the pawl-support, is a lever $B^3$, having a handle for operation thereof and an extension of one of its bearing-arms $D^3$, which is in position to bear by its end against the arm of the pawl, so that swinging this lever by its handle to the right its arm will press upon the pawl-arm and moving it down and its support cause the pawl to engage with a tooth of the platen-gear, and pressing the lever its full movement the platen will be turned correspondingly, which movement is limited by the pawl-supporting arm $Y^2$ abutting by its arm $v^4$ against the bent end $f^3$ of an upright $A^3$ of a lever $B^6$, pivoted at $b^5$ to the support to move vertically thereon, this lever having a handle $C^3$ for operation thereof and an arm $D^7$, which extends between two pins $d^5$, and held to its bearing against the one or the other by a flat spring $E^3$, secured at $e^5$ to the support, its free end extending down in front of the end of the arm $D^7$ and having two notches or seats $F^3$, formed by bending the spring, into which the end of the lever-arm projects, and when swung up into its upper notch the platen can be turned the distance of one gear-tooth, which is the shortest space between two lines of print on the paper sheet, and when in its lower notch the platen being turned the distance between the printing-lines, the lever being moved from one to the other by operating its handle.

Pivoted on a horizontal shaft $L^3$ of an arm $M^3$ are two spools $N^3$, which carry the ink-ribbon, each spool being free to turn on the shaft independently of the other, and the edges of each spool-flange nearest each other having ratchet-teeth, with which a wire $P^3$, having a flat sharpened edge $b^6$, is arranged to engage. This wire is bent sidewise to be out of the way, and extending forward is connected to the pivot in the upper end of the arm $A^2$ of the rod $Z'$ and then extends down and back a short distance, as at $a^6$, and has secured to it at its lower end a spiral spring $Q^3$, which by its other end is connected to the pawl $M^2$, engaging with grooved plate $L^2$ of the rock-shaft, which spring acts to hold the wire to its engagement with the flange of a spool and to allow movement of the pawl $M^2$ when turning the plate $L^2$ to increase or decrease the tension of the rock-shaft spring.

The wire $P^3$ near the spools passes through an opening $R^3$ in a plate $S^3$, secured to an arm or rod $G^3$ of the support, which opening has two notches or seats $d^5$, opening downward, with a projection $e^5$ between them, these seats being respectively in front of and in line with the adjacent flanges of the two spools, and which notches also serve as guides to the movements of the wire, the wire being held in its seat by its spring $Q^3$. As the arm $A^2$ of the rod $Z'$ is moved back to operate the rock-shaft the wire pawl $P^3$ is also moved back sufficiently to turn the ribbon-spool with which it engages a certain distance, and as the arm $A^2$ returns to its normal position the wire pawl $P^3$ is moved forward to be in position to engage at another place in the spool-flange for operation on it, as before. To change the wire from one spool to the other, press down the pawl-wire near its end by hand and move it from its seat over the central portion $e^5$ into its other seat.

The ink-ribbon $K^5$ is wound upon one spool and from thence passes down under a roll $L^5$, pivoted to the support on which the spools are supported, then forward substantially in a horizontal plane over the roll $M^5$, arranged to turn on a horizontal rod $N^5$, disposed in open bearings $r^6$ in arms $P^5$ of the frame, and passes down below a portion of the frame and around a pulley $Q^5$, pivoted at $t^6$ to the lower end of an arm $R^5$, hung upon the roll-rod $N^5$ and resting at its lower end upon a portion of the frame, the pulley being pivoted to make a quarter-turn of the ribbon, thence upward over another roll $S^5$, turning on the rod $N^5$, to and under a roll side of the roll $L^5$ on to the other spool, passing under the bar of the supporting-arm.

Each finger-key operates the rock-shaft for the movement of the paper-platen carriage-frame in the same manner by its connection with the universal rod as before described for the space key, so that after a finger-key has printed a letter or character as it rises the carriage-frame will be moved as described to bring the paper-roll and the paper sheet thereon into proper position for the next letter or character to be printed thereon.

Behind the paper-platen is the table-plate $J^4$, extending the length of the platen, which is curved backward and by its rear side is secured to the back rod $G$ of the platen-frame by a series of clasps $K^4$, which are secured to the plate and extend round the outside of the rod, the plate extending therefrom down close to the back of the platen and at its lower edge secured by three narrow strips or pieces $L^4$, one at each end and a central one, to the lower edge of a curved plate $M^4$, which extends under the platen and up its front side substantially concentric with the platen and bearing by its free and upper edge against the front rod $F$, and having at intervals along its front edge narrow projecting pieces $N^4$, which extend over and partially around the rod $F$. The strips or clasps $L^4$ securing these two plates together are bent outward, as at Fig. 2, to form seats for the end journals $b^6$ and a central journal of a feed-roll $P^4$, which bears upon the paper-roll, as shown in Fig. 2.

In a longitudinal slot $e^7$ in the upper side of the front rod $F$ of the platen-frame is a plate $Q^4$, extending along the length of the rod, and which extends partially up and over the front of the paper-platen, substantially concentric thereto and a short distance therefrom, and at its upper edge it projects in a series of flat spring-arms $R^4$ to or nearly to the upper part of the platen, and adapted to lie close to but not bear upon the platen at their free ends.

Pivoted on the outer side of each of the end and central arms $R^4$ of this plate is a shaft $S^4$, which at intervals, and extending between the several arms, is enlarged to form feed-rolls $a^7$ to bear upon the paper-platen. The front rod $F$ is arranged to turn on the smaller ends or portions $f^4$ of screws $T^4$, which pass through the cross-rod $H$ and screw into studs $U^4$ of the diameter of the cross-rod, the inner ends of which studs fit in a groove $v^7$ in the inner side of the cross-rods to keep them firm and from turning, and on which the links $J$, on which the paper-platen swings, are attached, these studs forming practically a continuation of the cross-rod $S$.

On the rod $F$, beyond the paper-platen, is secured a spring-wire $V^4$, which bears against the under side of the platen-shaft $C$, serving to hold the arms $R^4$ of the plate $Q^4$ at their free ends to the surface of the platen and the feed-roll $S^4$ to bear close upon the platen, the spring-arms, when the paper is in position on the roll, pressing the paper close thereto. Secured to the rod $F$ at $g^7$ is a wire arm $W^4$, projecting upward as a handle for swinging the rod on its pivots and the arms $R^4$ up, and also the feed-rolls $a^7$ from its bearing upon the platen, when desirous of truing the paper sheet thereon.

$A^5$ is a plate above the paper-roll and extending its length and slightly curved upward and secured at each end, respectively, to an arm $B^5$ and pivoted on the platen-shaft so they can swing thereon, each arm having projections $C^5$, which rest on the rear rod $G$ of the paper-roll frame, and an extension $h^7$ of such arm having a shoulder $m^7$ at its end, which when the plate is swung up abuts against the under side of the rear rod, limiting the upward movement of the plate, these arms having a handle $D^5$ for operation of the same. Secured to these arms in front of the plate is a strip $E^5$ to leave a longitudinal opening or space $n^7$ between the two the length of the paper-platen and a short distance therefrom, which strip has its upper side beveled each way toward its edges from the longitudinal central line of the same, on which bevels are two scales $F^5 G^5$, numbered as shown in plan view, Fig. 1ª. On the end of the arm which has the alinement-slot is an edge-piece $H^5$, projecting forward, its front end or point $J^5$ being so located that when this scale-strip is moved forward the central longitudinal line of the scale-strip will be about under the point, and the scales being so arranged that whatever mark of the rear scale is under the point $J^5$ the corresponding number or mark on the front scale will be under the alinement-slot $G^4$, indicating at what number the letter then printed would be in line with, so that by these scales and the point J⁵ the paper-platen can be moved along for the letter to be printed at any desired place on the paper sheet.

T³ is the bell, and it is secured to a support U³, which surrounds the central rod Q of the shift-frame, so it can freely slide back and forth along the rod, and there secured by a set-screw V³, having a milled head for turning the same. Pivoted at $f^6$ on this support U³ is the hammer W³ of the bell, arranged to swing vertically thereon and having an extension Y³ above its pivot for its operation. Pivoted at $g^5$ on the arm supporting the wheel e of the platen-frame is a small plate A⁴, to an arm of which extending backward or at right angles therefrom is a rod B⁴, which is in the same vertical and horizontal planes of the extension Y³ of the bell-hammer. A slot C⁴ in the upper part of this plate A⁴, through which passes a screw $h^6$, screwing into the arm d, limits the movement of the arm B⁴ up and down. This arm is to cause the hammer to strike the bell, and in operation as the carriage moves to the left the arm B⁴ strikes against the right side of the extension Y³ of the bell-hammer and in its continued movement causes it to rise, and as it passes over its end the hammer-arm is free to fall by its gravity and strike the bell, sounding the same, and when the paper-roll frame is moved back or to the right the pawl as it passes by the hammer-arm is swung up on its pivot and freely passes over the same.

The bell can be moved at any desired point on the rod to be sounded at any desired place in the movement of the carriage-frame.

In the use of this type-writing machine the paper sheet is put down in front of the plate or paper table J⁴, between it and the paper-platen, and then the platen turned to the right by taking hold of its handle, which draws the sheet between it and the under feed-roll, being guided around the paper-platen by the curved plate until it reaches the small sectional feed-roll in front of the platen, passing under and between the spring-arms and the platen. The scale-strip and plate is then swung forward, and as the paper sheet moves forward it is guided as it leaves the spring-arms under the strip and then out through the slit or opening between it and the upper curved guard-plate, which is for the purpose of guiding the paper upward and free of the machine, and when in this position the plate and strip are allowed to swing back to their normal position out of the way. In turning the platen as described, if desired, the spring-pin S² can be released from its engagement therewith by pressing its finger-lever to the right, enabling the platen to be turned the more freely and easily, although from the shape of the gear-teeth and the engaging end of the spring-pin the paper-roll can be turned without much difficulty. With the paper thus in position the machine is ready to print, which is done by striking the key of the letter desired, which moves the type-bar, its end entering the alinement-slot and the type thereon striking upon the ribbon and printing the letter on the paper sheet. The position of the platen carriage-frame is such that its ratchet-tooth bar rests by one of its teeth against the spring-tooth pawl, which is moved longitudinally, so that its tooth is under the tooth of the permanent plate. As the key is moved down through its upright-rod connection with the universal bar which is connected to the rock-shaft the rock-shaft is moved so as to swing the two tooth-plates down, which carries the permanent plate down so that its tooth engages with the carriage-frame ratchet-bar, and in such position so long as the key is held down the carriage-frame is held from movement. After the ratchet-bar has made an engagement with the permanent-plate tooth the spring-pawl tooth, being free from action of its spring, is immediately moved back the limit of its slot. Immediately the key is allowed to rise the spring operates upon the rock-shaft to raise its tooth-plates, so that the permanent-plate tooth passes above and is disengaged from the carriage-frame ratchet-bar and the spring-pawl tooth moved up to and into engagement with the ratchet-bar, and as the pawl is free to be moved back the coiled spring attached to the carriage-frame pulls the carriage-frame back, carrying with it the spring-pawl, which is stopped by the abutment of the end of the slot of the spring-tooth pawl against the cross-pin, when the paper sheet is in position to have another letter printed thereon.

To make one or more spaces between the letters, press down the space-key which operates the rock-shaft and its spring-pawl, as before, letting the carriage move, but without printing. The keys having figures thereon also have other marks, such as punctuation-marks, &c., and to print one or the other the carriage-frame is operated as described for the small letters and capitals.

The arm on the shift-frame rod carrying the bell-hammer and bell can be moved to any point along its supporting-rod desired for operation by the swinging pawl on the carriage-frame arm, which thus sounds the bell as a warning that the platen has moved nearly to its limit to the left, when the carriage-frame can be moved to the right back to its starting-point, where it is stopped by the carriage-frame-wheel arm abutting against a block V⁵, which is adapted to slide on the guide-rod W and be secured at any desired place thereon by a set-screw W⁵. As the key is pressed down to print, the wire pawl is pushed ahead sufficient to turn the ribbon-spool to cause a new or fresh portion of the ribbon to be under the alinement-slot for the printing of the next letter, and as the key rises the wire pawl is returned to its position to move the ribbon, as before. The lower rod R of the shift-frame, to which the wire is attached, is of small diameter to give more or less of spring or yield to the rod, so that when the shift-key is pressed down it will require a slight extra pull upon the rod, springing the same forward, to allow the weighted pawl to engage with the cone on the wire. After printing a line and desirous of turning the platen to present a new portion of the paper to print the next line move the lever to the right, which operates its pawl and turns the paper-platen a distance equal to one or two of its gear-teeth, according to the amount of movement allowed the lever by its stop-lever. To move the carriage-frame to the left without operating its space-key, press the lever $J^3$, which moves the flat strip $H^3$ forward and pressing against the spring-pawl disengage it from the ratchet-bar, when the carriage-frame can move freely along, as desired, and be stopped by releasing the lever. If desirous of truing the paper on the platen, press forward the arm $W^4$ at the left, secured to the rod F, which raises the sectional feed-roll from its pressure upon the platen, when the paper can be adjusted as desired, and then releasing the lever the feed-roll will be held by its spring against the platen, as before. A spring $f^3$, encircling the rod D and bearing by one end $g^5$ against the under side of the pawl-support $Y^2$ and by its other end against the rod, serves to return its operating-lever pawl and its support to their normal positions.

The screw $a'$ for its enlarged portion has a sleeve $H^4$ loosely fitting over the same, so that there will be as little friction as possible against the guide-rod W.

The arm $D^3$ of the pawl-support, when the pawl is swung down to move the paper-platen, abuts against the upper end $N^5$ of the support $T^2$, which not only limits its downward movement, but also locks the pawl with the paper-roll gear, holding the paper-platen firmly in such position.

Having thus described my invention, what I claim is—

1. In a type-writing machine, in combination, a paper roll or platen, a frame on which said platen is supported, a swinging frame supporting one side of said frame, mechanism connected to the swinging frame for operating the same, a support for said platen-frame on the opposite side to said swinging frame, and links pivoted at their lower ends to a suitable support, and at their other ends to said platen-frame on the opposite side to the swinging frame for holding the platen-frame in place.

2. In a type-writing machine, in combination, a carriage-frame adapted to move back and forth on suitable guideways, a ratchet-toothed bar on said frame, a rock-shaft, a permanent plate on said shaft, a ratchet-tooth in the edge of said plate, a plate pivoted to said shaft by a slot, below said permanent toothed plate, a ratchet-tooth on the edge of said pivoted plate, a guide-bearing for the free end of said pivoted plate, a spring arranged to bear upon the end and side of said pivoted plate, and both plates adapted to engage alternately by its tooth with said ratchet-tooth bar.

3. In a type-writing machine, in combination, a carriage-frame adapted to move back and forth in suitable guideways, ratchet-teeth on said frame, a rock-shaft, a plate pivoted by a slot to said shaft having a ratchet-tooth on one edge arranged to engage with said frame ratchet-teeth, a strip having diagonal slots engaging with pins in said frame to slide diagonally back and forth thereon below said ratchet-teeth and to bear upon said pivoted plate in its forward movement, and a pivoted lever engaging with said strip for operation thereof.

4. In a type-writing machine, in combination, two ink-ribbon spools side by side arranged to turn on a suitable support, flanges of said spools having teeth on their edges, a spring-pawl arranged to engage alternately with said spool-flanges, a rock-shaft to which said spring-pawl is secured, means for operating said shaft, a fixed plate in front of said spools having an opening through it and two notches or seats in upper part of said opening, a downward projection between the two, with which notches the spring-pawl is alternately guided and held in its operation on the two spools.

5. In a type-writing machine, two ink-ribbon spools arranged to turn on a suitable support side by side, a platen-roll in front of said spools, two rolls back of said platen and each substantially under its respective spool, two rolls forward of the platen side by side and in line with the first two spools and substantially in the same horizontal plane, and a roll with flanges in front of said latter rolls and at an angle thereto, by which the ink-ribbon from one spool will run under its roll, over the roll in front and round the flanged roll, back over the other front roll and under the other rear roll in line with and to the other spool.

6. In a type-writing machine, in combination, a paper roll or platen, a rod in front of and parallel with said roll pivoted to a suitable support, a plate secured thereto having a series of spring-arms projecting transversely therefrom and arranged to bear close to said roll, a shaft pivoted on said plate, and a series of rolls secured thereto said rolls being located respectively between the spring-arms and arranged to bear upon the paper-roll.

7. In a type-writing machine, in combination, a lever pivoted to a suitable support, an upright rod adapted to move up and down in suitable guideways and connected to means for moving the paper-roll frame on its support, said rod being made in two parts, each screwing in a block between them, the block having an opening in its side in which one arm of the lever extends and engages.

8. In a type-writing machine, in combination, a paper roll or platen, a frame to which said roll is secured, a swinging frame to which said paper-roll frame is connected, a rod connected to said swinging frame extending toward the front of the machine, a lever adapted to engage with said rod for operation thereof, a weighted pawl resting by its free end on said rod, and a shoulder on said rod adapted to abut against the end of the pawl when operated upon by said lever.

9. In a type-writing machine, in combination, a paper roll or platen, a frame to which said roll is secured, a swinging frame to which said paper-roll frame is connected, a rod connected to said swinging frame, extending toward the front of the machine, a shoulder on said rod, a lever adapted to engage with said shoulder, another lever engaging with said first lever and extending to the front of the machine for operation thereof, a weighted pawl resting by its free end on the rod, being adapted to abut against the end of the pawl when operated upon by the levers.

10. In a type-writing machine, in combination, a paper roll or platen arranged to turn on a suitable support, a gear on its end, a pawl adapted to engage with said gear for turning said roll, and to rest on a support when disengaged from said gear, a pivoted support for said pawl, a lever arranged to bear upon said pawl for operation thereof, an abutment or stop, an arm of said pawl-support adapted to rest against said abutment, and a spring for returning the pawl-support.

In testimony whereof I have hereunto set my hand in the presence of two subscribing witnesses.

JOSEPH A. WHITE.

Witnesses:
 EDWIN W. BROWN,
 LEONA C. ARNO.